US011935689B2

(12) United States Patent
Wakabayashi

(10) Patent No.: US 11,935,689 B2
(45) Date of Patent: Mar. 19, 2024

(54) METHOD FOR MANUFACTURING COIL COMPONENT HAVING COIL PART WITH FLAT-SHAPED CONNECTION END PARTS

(71) Applicant: TAIYO YUDEN CO., LTD., Tokyo (JP)

(72) Inventor: Hirotaka Wakabayashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 586 days.

(21) Appl. No.: 17/224,006

(22) Filed: Apr. 6, 2021

(65) Prior Publication Data

US 2021/0225581 A1 Jul. 22, 2021

Related U.S. Application Data

(62) Division of application No. 16/049,448, filed on Jul. 30, 2018, now Pat. No. 11,004,593.

(30) Foreign Application Priority Data

Aug. 2, 2017 (JP) ................................ 2017-149935

(51) Int. Cl.
*H01F 27/29* (2006.01)
*H01F 17/04* (2006.01)
(Continued)

(52) U.S. Cl.
CPC .......... *H01F 27/29* (2013.01); *H01F 17/045* (2013.01); *H01F 27/24* (2013.01);
(Continued)

(58) Field of Classification Search
CPC .... H01F 17/045; H01F 27/24; H01F 27/2823; H01F 27/2828; H01F 27/29; H01F 41/04; Y10T 29/4902
(Continued)

(56) References Cited

U.S. PATENT DOCUMENTS 6,144,280 A 11/2000 Amada et al.
6,393,691 B1 * 5/2002 Ogawa ................. H01F 17/045 336/200
(Continued)

FOREIGN PATENT DOCUMENTS

JP 2003249412 A 9/2003
JP 2004006904 A 1/2004
(Continued)

OTHER PUBLICATIONS

Non-Final Office Action issued by U.S. Patent and Trademark Office, dated Sep. 18, 2020, for U.S. Appl. No. 16/049,448 (16 pages).
(Continued)

*Primary Examiner* — Thiem D Phan
(74) *Attorney, Agent, or Firm* — Law Office of Katsuhiro Arai

(57) ABSTRACT

A method for manufacturing a coil component having a coil part with a flat-shaped connection end parts, includes step of physically and electrically connecting ends of the coil part and terminal electrodes, respectively, by thermocompression bonding wherein the ends of the coil part are heated and compressed, thereby deforming the ends of the coil part into the flat-shaped connection end parts and bonding the flat-shaped connection end parts to the terminal electrodes, respectively.

11 Claims, 7 Drawing Sheets

(51) Int. Cl.
*H01F 27/24* (2006.01)
*H01F 27/28* (2006.01)
*H01F 41/04* (2006.01)

(52) U.S. Cl.
CPC ..... *H01F 27/2823* (2013.01); *H01F 27/2828* (2013.01); *H01F 27/292* (2013.01); *H01F 41/04* (2013.01); *Y10T 29/4902* (2015.01)

(58) Field of Classification Search
USPC ..................... 29/602.1, 25.03, 605, 606, 608
See application file for complete search history.

(56) References Cited

U.S. PATENT DOCUMENTS

| | | | |
|---|---|---|---|
| 6,882,261 B2 | 4/2005 | Moro et al. | |
| 8,174,820 B2 * | 5/2012 | Kabe | H01G 9/0425 29/25.03 |
| 2017/0079147 A1 | 3/2017 | Ogawa | |

FOREIGN PATENT DOCUMENTS

| | | |
|---|---|---|
| JP | 2010171054 A | 8/2010 |
| WO | 2009037978 A1 | 3/2009 |

OTHER PUBLICATIONS

Notice of Allowance issued by U.S. Patent and Trademark Office, dated Jan. 12, 2021, for U.S. Appl. No. 16/049,448 (8 pages).

* cited by examiner

METHOD FOR MANUFACTURING COIL COMPONENT HAVING COIL PART WITH FLAT-SHAPED CONNECTION END PARTS

CROSS-REFERENCE TO RELATED APPLICATIONS

This application is a divisional of U.S. patent application Ser. No. 16/049,448, filed Jul. 30, 2018, which claims priority to Japanese Patent Application No. 2017-149935, filed Aug. 2, 2017, each disclosure of which is incorporated herein by reference in its entirety.

The applicant herein explicitly rescinds and retracts any prior disclaimers or disavowals made in any parent, child or related prosecution history with regard to any subject matter supported by the present application.

BACKGROUND

Field of the Invention

The present invention relates to a winding-type coil component.

Description of the Related Art

As a type of coil component, a winding-type coil component is known. For example, Patent Literature 1 describes an electronic component comprising a Cu wire wound around an insulating base body, and electrodes (Sn—Cu plating layers) formed on the insulating base body, wherein the ends of the wire are embedded in and thermally compressed with, and brazed to, the insulating base body.

Also, Patent Literature 2 discloses a winding-type electronic component having: a core around which a conductive wire is wound; top and bottom flanges formed on the top and bottom ends of the core, respectively; and a pair of external electrode parts which are formed at different positions at the end parts of the bottom face of the bottom flange and to which respective end parts of the conductive wire are connected. The external electrode parts are constituted in such a way that each has a concave part including a groove part formed on the bottom face of the bottom flange, and a solder filled in the concave part, wherein an end part of the conductive wire is led into the groove part and buried in the solder.

BACKGROUND ART LITERATURES

[Patent Literature 1] Japanese Patent Laid-open No. 2004-006904

[Patent Literature 2] Japanese Patent Laid-open No. 2010-171054

SUMMARY

In recent years, development of higher-performance electronic devices such as mobile devices are creating a demand for high-performance components that can be used in these devices. In particular, power consumption is oftentimes an important consideration when it comes to mobile devices, and consequently there is a need for coil components achieving lower resistance.

However, the constitution according to Patent Literature 1 makes it difficult to lower the resistance of the coil component because it uses a wire with a relatively small diameter of 20 μm to 60 μm. On the other hand, the constitution according to Patent Literature 2 is advantageous to lowering the resistance because it is described that a conductive wire with a thickness of 30 μm to 350 μm can be used. However, this constitution is such that the conductive wire is led out to the surface of the bottom flange of the core, after which the conductive core is embedded in the concave part provided on the surface of the bottom flange. Size reduction is difficult according to such constitution because it requires a concave part for securing a thick conductive wire, and a thick solder to fill the concave part.

In light of the aforementioned situation, an object of the present invention is to provide a winding-type coil component that can achieve a lower resistance in a smaller body.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, a coil component pertaining to a mode of the present invention comprises a core member, a coil conductive wire, and terminal electrodes.

The core member has a pillar part.

The coil conductive wire has a coil part wound around the pillar part, and flat-shaped connection end parts provided at respective ends of the coil part.

The terminal electrodes are formed on the surface of the core member and electrically connected to the connection end parts.

Each of the terminal electrodes has an electrode layer and a conductive layer covering the electrode layer.

Each of the connection end parts has a first principle face electrically connected to the surface of the electrode layer, a second principle face projecting from the surface of the conductive layer, and a side face continuing to the first principle face and the second principle face.

The conductive layer has a flat area having a first thickness, and a skirt area provided between the flat area and the side face and having a second thickness greater than the first thickness. The skirt area slopes onto the side face, the first thickness is smaller than the thickness of each of the connection end parts, and the second thickness decreases in the direction away from the side face.

According to such coil component, a highly reliable winding-type coil component is provided that achieves a lower resistance in a smaller body.

In the aforementioned coil component, the thickness of each of the connection end parts may be 25 μm or greater but no greater than 145 μm.

According to such coil component, the resistance of the coil component is certainly lower.

In the aforementioned coil component, the first thickness may be 20% or more but no more than 50% of the thickness of each of the connection end parts.

According to such coil component, cracks do not generate easily in the conductive layer, which leads to improved reliability.

In the aforementioned coil component, the width of the skirt area in the direction from the flat area toward the side face may be smaller than the thickness of each of the connection end parts.

According to such coil component, cracks do not occur easily in the conductive layer, which leads to improved reliability.

In the aforementioned coil component, each of the terminal electrodes may further have a first alloy layer formed between each of the connection end parts and the electrode layer.

According to such coil component, the adhesive force between each of the connection end parts and the electrode layer increases, which leads to improved reliability.

In the aforementioned coil component, each of the terminal electrodes may further have a second alloy layer formed between each of the connection end parts and the skirt area.

According to such coil component, the adhesive force between each of the connection end parts and the conductive layer increases, which leads to improved reliability.

As described above, according to the present invention a winding-type coil component is provided which can achieve a lower resistance in a smaller body.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
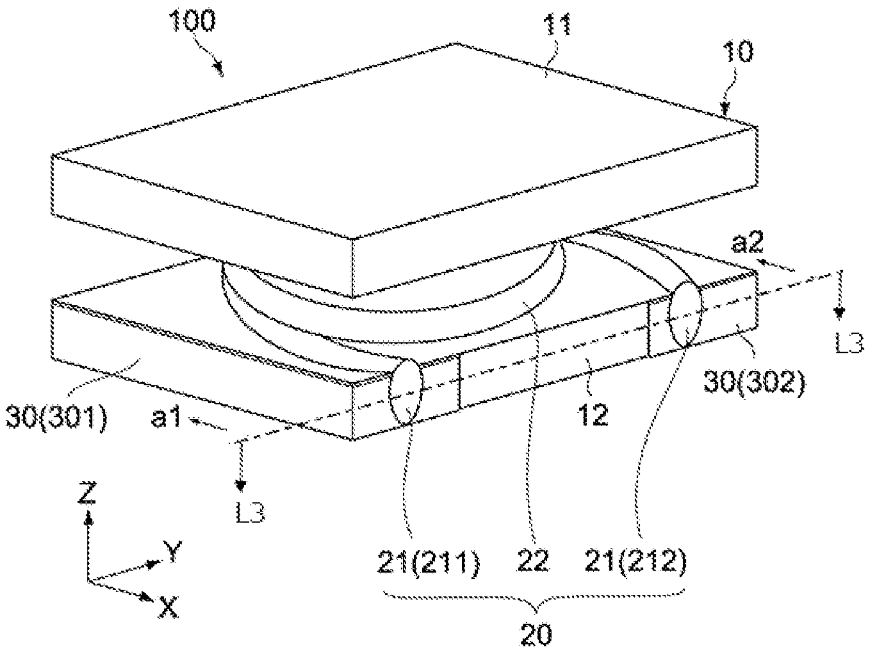
FIG. 1 is a schematic oblique view showing a coil component pertaining to this embodiment.

10—Core member
11—First plate part
12—Second plate part
13—Pillar part
20—Coil conductive wire
21—Connection end parts
21A—First principle face
21B—Second principle face
21W—Side face
211—First connection end part
212—Second connection end part
22—Coil part
30—Terminal electrodes
301—First terminal electrode part
302—Second terminal electrode part
31—Electrode layer
311—First electrode layer
312—Second electrode layer
32, 35—Conductive layer
32*a*—Flat area
32*b*—Skirt area
32*st*, 35*st*—Internal stress
331—First alloy layer
332—Second alloy layer
333—Third alloy layer
35*c*—Crack
100—Coil component
500—Heater tip

DETAILED DESCRIPTION OF EMBODIMENTS

An embodiment of the present invention is explained below by referring to the drawings. XYZ-axis coordinates may be introduced to each drawing.

The embodiment of the present invention is explained below by referring to the drawings.

(Basic Constitution of Coil Component)

FIG. 1 is a schematic oblique view showing the coil component pertaining to this embodiment.

Figure 2A:
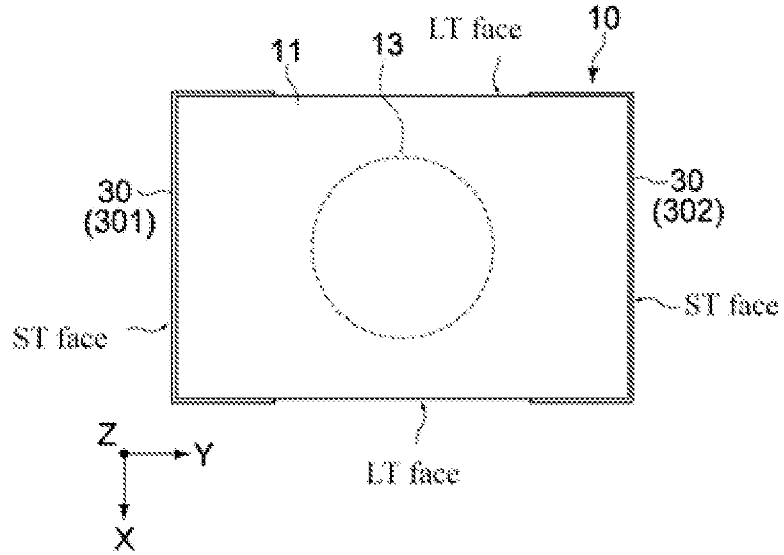
FIGS. 2A, 2B, and 2C are a schematic top view, a schematic side view, and a schematic bottom view, of a core member in the coil component, respectively.
Figure 2B:
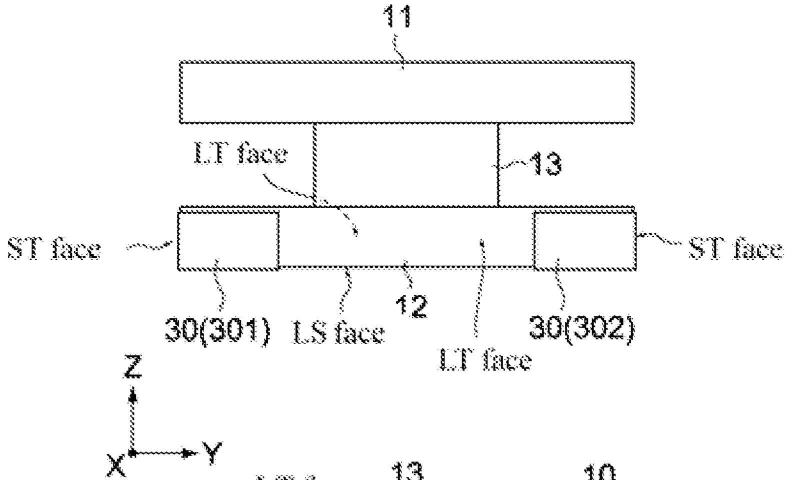
Figure 2C:
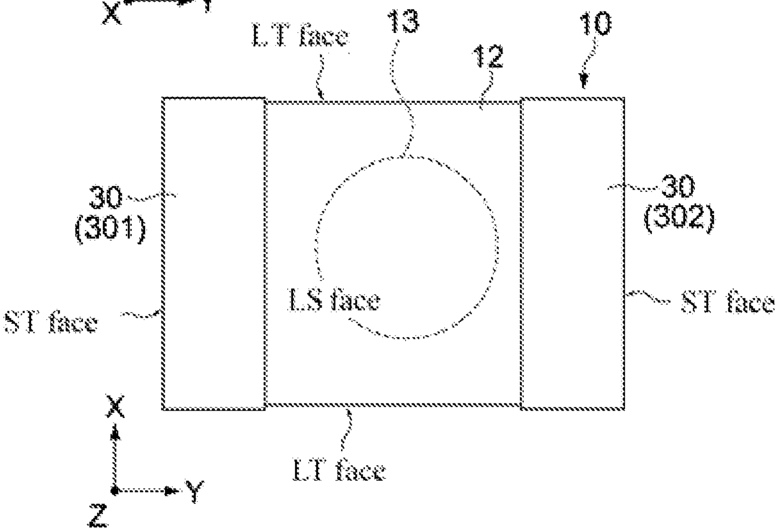

FIGS. 2A, 2B, and 2C are a schematic top view, a schematic side view, and a schematic bottom view, of the core member in the coil component, respectively.

In each drawing, an X-axis, a Y-axis, and a Z-axis represent three respective axis directions perpendicular to one another.

A coil component 100 in this embodiment comprises a core member 10, a coil conductive wire 20, and terminal electrodes 30.

The core member 10 has a first plate part 11, a second plate part 12, and a pillar part 13.

The pillar part 13 is provided between the first plate part 11 and the second plate part 12. The pillar part 13 is formed in a cylindrical shape and has a center of axis parallel with the Z-axis direction. The shape of the pillar part 13 is not limited to the above, and it may have a prism, elliptical pillar, or other shape. The pillar part 13 serves as the winding core of the coil conductive wire 20. The length and diameter of the pillar part 13 are set in any way as deemed appropriate according to the diameter, length (number of windings), etc., of the coil conductive wire 20. The number of windings is 20, for example.

The first plate part 11 is connected to one end part (the top end part in FIG. 2B) of the pillar part 13, while the second plate part 12 is connected to the other end part (the bottom end part in FIG. 2B) of the pillar part 13. The first and second plate parts 11 and 12 are each formed in a rectangular planar shape having its long sides in the Y-axis direction and short sides in the X-axis direction, and each of them has each end part of the pillar part 13 connected to its center part.

The second plate part 12 has two planes (hereinafter also referred to as "ST faces") demarcated by its short sides and sides running in the thickness direction, two planes (hereinafter also referred to as "LT faces") demarcated by its long sides and sides running in the thickness direction, and a principle face (hereinafter also referred to as "LS face") demarcated by its long sides and short sides (FIGS. 2B and 2C).

The first plate part 11, the second plate part 12 and the pillar part 13 are typically constituted by a magnetic material having electrical insulation property, each formed in one piece. The type of magnetic material is not limited in any way, and a ferrite material, metal magnetic grains, etc., may be used.

A ferrite material is a compound oxide which consists of an iron oxide and an oxide of other metal, and manifests magnetic property. Any known ferrite material may be used without limitation. For example, use of a Ni—Zn ferrite, Mn—Zn ferrite, etc., is preferred. Any such ferrite material is mixed with a binder, and the mixture is pressed using dies and formed into a drum shape, which is then sintered, etc., to obtain the first and second plate parts 11 and 12 and the pillar part 13. Glass coating or other powder treatment may be applied to the ferrite material.

Metal magnetic grains form a material that manifests magnetic property in unoxidized metal parts, and examples include unoxidized alloy metal grains and grains around which an oxide, etc., is provided. Metal magnetic grains include grains manufactured according to the atomization method, for example. Metal magnetic grains include, for example, alloy grains such as Fe—Si—Cr, Fe—Si—Al, and Fe—Ni grains, amorphous grains such as Fe—Si—B—C, Fe—Si—B—Cr, and Fe grains, materials made by mixing the foregoing, etc., where use of a compact powder obtained from such grains and a resin is preferred. More preferable is a compact powder formed by thermally hardening a resin, as it exhibits high insulation property, or a compact powder having an oxide film formed by heat treatment, as it exhibits high mechanical strength.

The coil conductive wire 20 has a coil part 22 and connection end parts 21 (a first connection end part 211 and a second connection end part 212). The coil part 22 of the coil conductive wire 20 is constituted by a sheathed conductive wire which is a metal wire made of copper (Cu), silver (Ag), etc., around which an insulating sheath made of polyurethane resin, polyester resin, etc., is formed. The coil part 22 is wound around the pillar part 13 of the core member 10. Furthermore, as shown in FIG. 1, one and the other connection end parts 21 (the first connection end part 211 and the second connection end part 212) are provided at respective ends of the coil part 22. The first connection end part 211 and the second connection end part 212, with their insulating sheaths removed, are connected to the respective terminal electrodes 30 (a first terminal electrode part 301 and a second terminal electrode part 302).

The length, diameter and cross-sectional shape of the coil conductive wire 20 are not limited in any way, and are set in any way as deemed appropriate according to specifications. Particularly for the coil conductive wire 20 in this embodiment, a coil conductive wire of which metal wire diameter is 55 μm or greater but no greater than 180 is used. By using a coil conductive wire comprising a relatively thick metal wire of 55 μm or greater but no greater than 180 μm in diameter, a coil component of which direct-current resistance is low and which can support high current, can be constituted.

The terminal electrodes 30 are formed on the surface of the second plate part 12 and include the first terminal electrode part 301 and the second terminal electrode part 302. The first terminal electrode part 301 and the second terminal electrode part 302 are formed on the two ST face sides of the second plate part 12 that are facing each other in the Y-axis direction, as shown in FIGS. 2A, 2B and 2C.

For example, the first terminal electrode part 301 is formed on the left ST face, in a manner bending and extending to respective partial areas (near the left end) of the LS face and LT face. The second terminal electrode part 302 is formed on the right ST face, in a manner bending and extending to respective partial areas (near the right end) of the LS face and LT face. Preferably the first terminal electrode part 301 and the second terminal electrode part 302 extend from the LS face to at least one half of the thickness. Each of the connection end parts 21 (the first connection end part 211 and the second connection end part 212) is led out to one LT face of the second plate part 12 and electrically connected to each of the terminal electrodes 30 (the first terminal electrode part 301 and the second terminal electrode part 302).

(Joining of Connection End Parts)

Figure 3A:
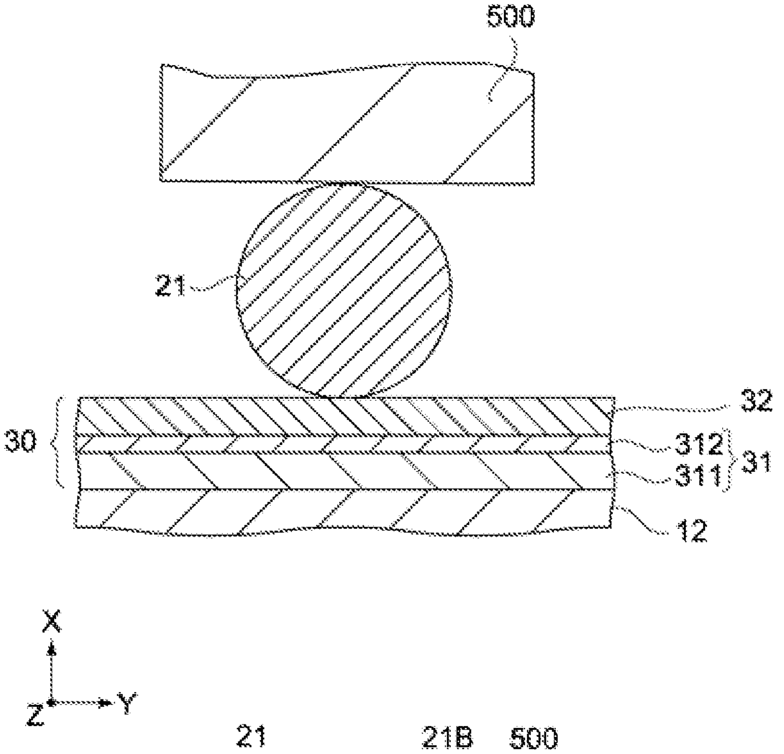
FIGS. 3A and 3B are schematic cross-sectional views explaining how one of the connection end parts is joined to a corresponding one of the terminal electrodes.
Figure 3B:
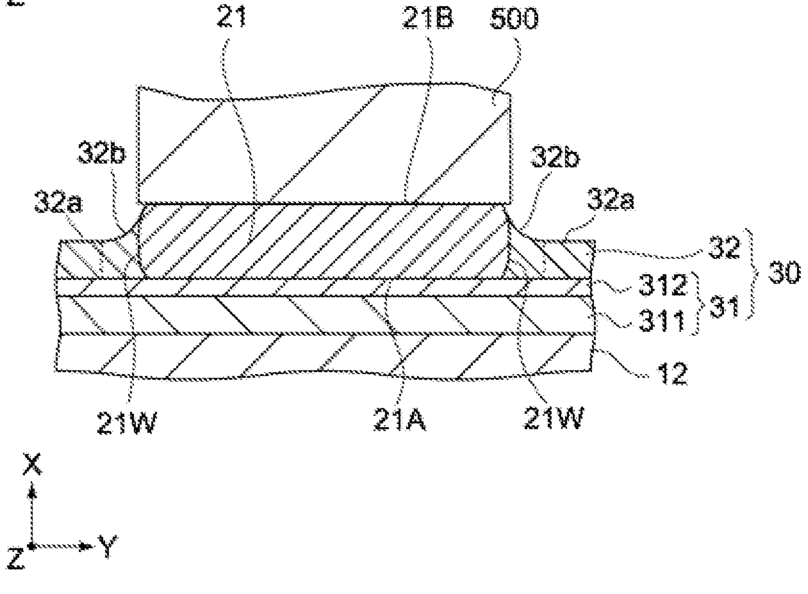

FIGS. 3A and 3B are schematic cross-sectional views explaining how one of the connection end parts is joined to the corresponding one of the terminal electrodes. FIGS. 3A and 3B correspond to a cross-section cut in a direction of arrows a1 and a2 in FIG. 1, wherein FIG. 3B is an enlarged cross-sectional view of a relevant part taken along a line L3 in FIG. 1, whereas FIG. 3A is an enlarged cross-sectional view of the relevant part before completing the joint.

First, FIG. 3A shows the state before one of the connection end parts 21 is joined to the corresponding one of the terminal electrodes 30.

As shown in FIG. 3A, each of the terminal electrodes 30 has a multi-layer structure. Each of the terminal electrodes 30 has an electrode layer 31, and a conductive layer 32 covering the surface of the electrode layer 31. Furthermore, the electrode layer 31 has a first electrode layer 311 and a second electrode layer 312. The first electrode layer 311 covers the second plate part 12. The second electrode layer 312 covers the surface of the first electrode layer 311.

The first electrode layer 311 is constituted by a sintered Ag paste or Cu paste, for example. The second electrode layer 312 is constituted by a Ni plating. It should be noted that, if necessary, the second electrode layer 312 may be eliminated. The conductive layer 32 covers the surface of the electrode layer 31. The conductive layer 32 is constituted by a solder plating. For example, the conductive layer 32 contains at least one of Sn, Sn—Au, Sn—Sb, Sn—Zn, Sn—Ag, Sn—Cu, and Sn—Bi. It should be noted that the conductive layer 32 may have a multi-layer structure consisting of multiple layers.

Each of the connection end parts 21 is a metal wire with its insulating sheath removed, and has roughly a circular cross-sectional shape before it is joined to each of the terminal electrodes 30. Then, the connection end parts 21, with their peripheries positioned in a manner facing the surfaces of the terminal electrodes 30, are thermally compressed to the terminal electrodes 30 using a heater tip 500 that has been heated to a prescribed temperature.

FIG. 3B shows the state after one of the connection end parts 21 has been joined to the corresponding one of the terminal electrodes 30.

In thermal compressing, the heater tip 500 is heated to a temperature (such as 700° C.) sufficient to cause the connection end parts 21 to deform, and applies pressing force to the connection end parts 21 from a position away from the connection end parts 21, to a position at which each of the connection end parts 21 becomes a prescribed thickness.

The magnitude of the pressing force exerted by the heater tip 500 can be set in any way according to the diameter of the coil conductive wire 20. For the pressing method, a method whereby a sufficient pressing force is applied, and the pressing is stopped at a pre-determined position so as to achieve a prescribed dimension of the connection end parts 21, can be adopted.

As for the pressing operation of the heater tip 500, preferably the pressing time is adjusted to be relatively short, with the pressing force removed over a relatively long period of time. This promotes a breakdown and disappearance of any insulating sheath layer that may remain locally between the connection end parts 21 and the terminal electrodes 30, thereby allowing an alloy layer to be formed between the connection end parts 21 and the terminal electrodes 30 with relative ease.

The rate of pressing of the connection end parts 21 by the heater tip 500 varies depending on the diameter of the coil conductive wire 20, where the setting, which becomes higher as the wire diameter increases, is typically 5 mm/s or greater but no greater than 30 mm/s.

As the heater tip 500 simultaneously presses and heats the connection end parts 21, the connection end parts 21 deform while the connection end parts 21 also undergo a compressing reaction with the terminal electrodes 30. For example, each of the connection end parts 21, now thermally compressed to each of the terminal electrodes 30, no longer has a roughly circular cross-sectional shape; instead, it has been crushed by the heater tip 500 in the X-axis direction and thus has a flat shape. Accordingly, the thickness of each of the connection end parts 21 is smaller than the diameter of the coil conductive wire 20. For example, the thickness of each of the connection end parts 21 is 25 μm or greater but no greater than 145 μm.

Each of the flat-shaped connection end parts 21 has a first principle face 21A facing and electrically connected to the surface of the electrode layer 31, a second principle face 21B projecting from the surface of the conductive layer 32, and a side face 21W continuing to the first principle face 21A and the second principle face 21B. The first principle face 21A and the second principle face 21B are each a roughly flat face. On the other hand, the side face 21W is a curved face, creating a convex shape bulging toward the outer side of each of the connection end parts 21.

On the other hand, the conductive layer 32 in contact with each of the connection end parts 21 is constituted so that its melting point is lower than the temperature of the connection end parts 21 when heated. With this constitution, the conductive layer 32 melts during thermal compressing, and as each of the connection end parts 21 deforms, it is pushed away by each of the connection end parts 21 toward the in-plane direction of the conductive layer 32.

Also, the electrode layer 31, while in contact with the first principle face 21A of each of the connection end parts 21, is constituted so that its melting point is higher than the temperature of the connection end parts 21 when heated. As a result, the surface of the electrode layer 31 in contact with each of the connection end parts 21 maintains its flatness. In other words, the second principle face 21B of each of the connection end parts 21 is formed flat as it contacts the heater tip 500, while the first principle face 21A of each of the connection end parts 21 is formed flat as it contacts the surface of the electrode layer 31.

The mode of the conductive layer 32 and the electrode layer 31 after thermal compressing is explained in greater detail.

Figure 4:
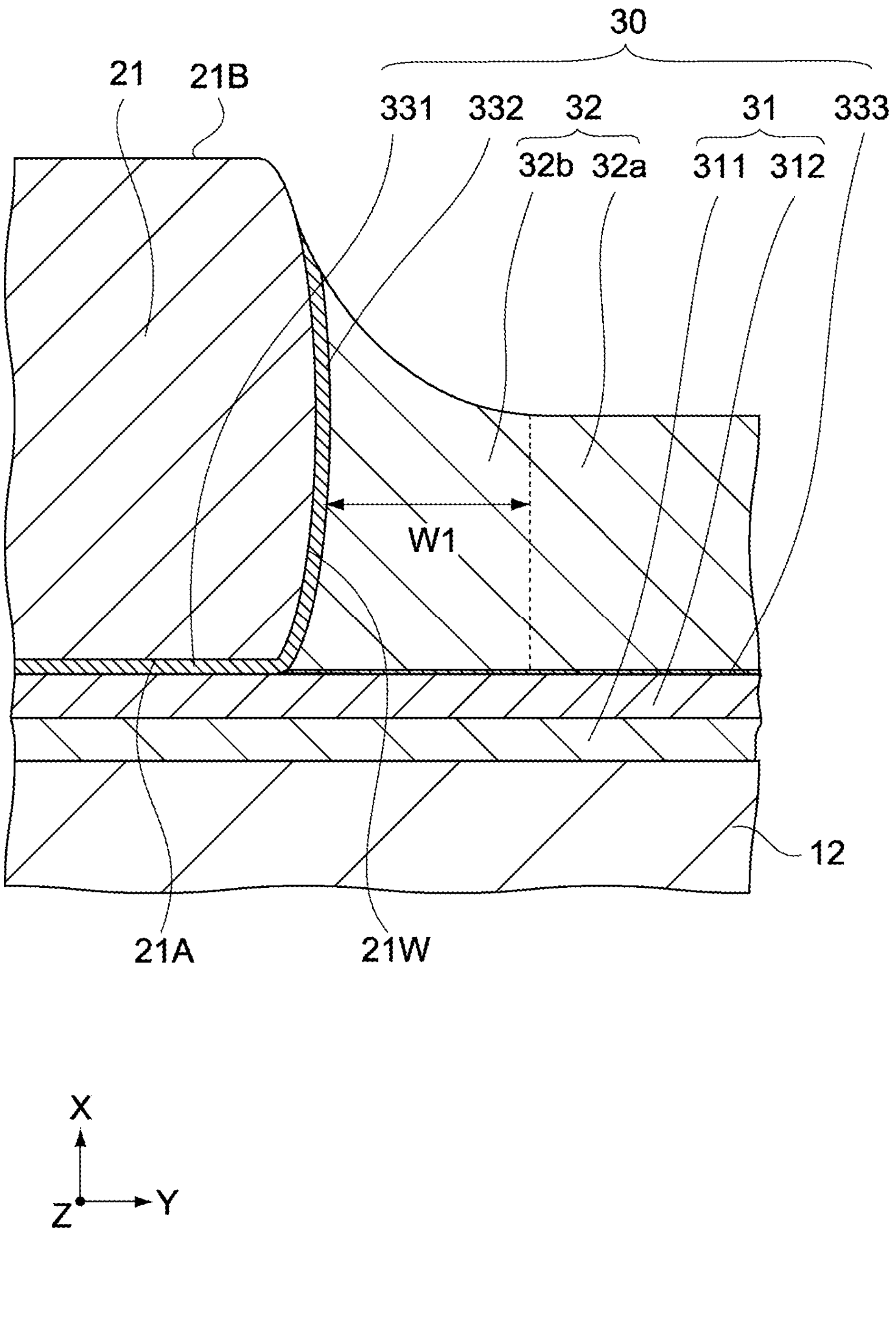
FIG. 4 is a schematic cross-sectional view explaining a mode of an electrode layer and a conductive layer after thermal compressing.

FIG. 4 is a schematic cross-sectional view explaining the mode of the electrode layer and the conductive layer after thermal compressing.

The conductive layer 32 has a flat area 32*a* and a skirt area 32*b*. The flat area 32*a* corresponds to a flat part on the outer surface of the conductive layer 32, running parallel with the electrode layer 31. On the other hand, the skirt area 32*b* is provided between the flat area 32*a* and the side face 21W of each of the connection end parts 21. The flat area 32*a* and skirt area 32*b* each have a prescribed thickness. It should be noted, however, that the thickness (a first thickness) of the flat area 32*a* is smaller than the thickness (a second thickness) of each of the connection end parts 21. The skirt area 32*b* is constituted so that its thickness is equal to or greater than the thickness of the flat area 32*a*, and also constituted so that it slopes onto the side face 21W, and it has a shape of which thickness decreases in the direction away from the side face 21W of each of the connection end parts 21.

The skirt area 32*b* is formed so that it melts due to heat input when each of the connection end parts 21 is thermally compressed, and rises from the flat area 32*a* toward the second principle face 21B of each of the connection end parts 21 in a manner spreading to, while wetting, the periphery area of each of the connection end parts 21. Also, the surfaces of the skirt area 32*b* and the flat area 32*a* are free from dents or projections and is smooth.

The thickness of the flat area 32*a* is 5 μm or greater but no greater than 72.5 μm, for example. It should be noted, however, that the surface of the flat area 32*a* is positioned lower than the surface of each of the connection end parts 21. For example, the thickness of the flat area 32*a* is preferably 20% or more but no more than 50% of the thickness of each of the connection end parts 21. The width W1 of the skirt area 32*b* in the direction from the flat area 32*a* toward the side face 21W of each of the connection end parts 21 is smaller than the thickness of each of the connection end parts 21. It should be noted that the thickness of the first electrode layer 311 is 10 μm or greater but no greater than 20 μm. The thickness of the second electrode layer 312 is 2 μm or greater but no greater than 6 μm.

Also, a first alloy layer 331 is formed between each of the connection end parts 21 and the electrode layer 31. The first alloy layer 331 is typically constituted by an alloy of the metal constituting the connection end parts 21 and the metal constituting the second electrode layer 312 or the metal constituting the conductive layer 32. The alloy is produced by the respective diffusing phenomena of each of the connection end parts 21, the second electrode layer 312 and the conductive layer 32, and their alloying phenomena, caused by the heat applied during the thermal compressing of the connection end parts 21. For example, the first alloy layer 331 is primarily constituted by an alloy layer consisting of at least one of Cu—Ni, Cu—Ag, Cu—Ni—Sn, Cu—Ag—Sn, etc. Here, the first alloy layer 331 may be a layer continuously formed over the electrode layer 31, or alloy areas scattered around on the electrode layer 31. In this embodiment, a continuous first alloy layer 331 is illustrated as an example, where the first alloy layer 331 collectively refers to a continuous first alloy layer and alloy areas of scattered first alloy layer. The thickness of the first alloy layer 331 is not limited in any way, but it is typically no greater than the thickness of the second electrode layer 312. For example, the thickness of the first alloy layer 331 (such as Sn—Cu—Ni alloy layer) is 0.05 μm or greater but no greater than 2 μm. It should be noted that the first alloy layer 331 may include voids. Due to this presence of voids, progression of cracks and other flaws due not only to thermal stress, but also to external shock, etc., is absorbed and mitigated, which in turn prevents progression of lowering of the joining strength.

Also, a second alloy layer 332 is formed between each of the connection end parts 21 and the skirt area 32*b* of the conductive layer 32. Here, the second alloy layer 332 may be a layer formed continuously over the side face 21W, or alloy areas scattered around on the side face 21W. In this embodiment, a continuous second alloy layer 332 is illustrated as an example, where the second alloy layer 332 collectively refers to a continuous second alloy layer and alloy areas of scattered second alloy layer. The second alloy layer 332 is typically constituted by an alloy of the metal constituting the connection end parts 21 and the metal constituting the conductive layer 32 or the second electrode layer 312. The alloy is produced by the respective diffusing phenomena of each of the connection end parts 21, the second electrode layer 312, and the conductive layer 32, and their alloying phenomena, caused by the heat applied during the thermal compressing of the connection end parts 21. For example, the second alloy layer 332 is primarily constituted by an alloy layer consisting of at least one of Cu—Sn, Cu—Sn—Au, Cu—Sn—Sb, Cu—Sn—Zn, Cu—Sn—Ag, Cu—Sn—Cu, Cu—Sn—Bi, etc. The thickness of the second alloy layer 332 is not limited in any way, but it is 0.05 μm or greater but no greater than 5 μm, for example.

Furthermore, a third alloy layer 333 is formed between the conductive layer 32 and the electrode layer 31. Here, the third alloy layer 333 may be a layer formed continuously over the electrode layer 31, or alloy areas scattered around on the electrode layer 31. In this embodiment, a continuous third alloy layer 333 is illustrated as an example, where the third alloy layer 333 collectively refers to a continuous third alloy layer and alloy areas of scattered third alloy layer. The third alloy layer 333 is typically constituted by an alloy of the metal constituting the conductive layer 32 and the metal constituting the second electrode layer 312. The alloy is produced by the respective diffusing phenomena of the second electrode layer 312 and the conductive layer 32, and their alloying phenomena, caused by the heat applied during the thermal compressing of the connection end parts 21. For example, the third alloy layer 333 is constituted by an alloy layer consisting of Sn—Ni, etc. The thickness of the third alloy layer 333 is not limited in any way, but it is typically no greater than the thickness of the second electrode layer 312. For example, the thickness of the third alloy layer 333 (such as Sn—Ni alloy layer) is 0.5 μm or greater but no greater than 5 μm.

In this embodiment, the first alloy layer 331, the second alloy layer 332 and the third alloy layer 333 are parts of each of the terminal electrodes 30.

(Manufacturing Method for Coil Component)

The method for manufacturing the coil component 100 of which constitution is described above, is explained.

First, the drum-core type core member 10 as shown in FIGS. 2A to 2C is produced. Next, the terminal electrodes 30 (301, 302) are formed on the second plate part 12 of the core member 10.

The first electrode layer 311 is formed by applying, by transfer, a metal paste to a prescribed areas including the ST faces of the second plate part 12, and then baking the paste at 680° C., for example. Next, the second electrode layer 312 is formed on the surface of the first electrode layer 311. Furthermore, the conductive layer 32 with a thickness of 4 μm or greater but no greater than 15 μm is formed on the surface of the second electrode layer 312.

Next, the coil conductive wire 20 is wound, by a prescribed number of times, around the pillar part 13 of the core member 10 on which the terminal electrodes 30 are provided, after which the respective connection end parts 21 of the coil conductive wire 20 are connected to the corresponding terminal electrodes 30 (301, 302).

Connecting the connection end parts 21 and the terminal electrodes 30 uses the thermal compressing method. In this step, the connection end parts 21 of the coil conductive wire 20 are positioned directly on the terminal electrodes 30, after which the connection end parts 21 are thermally compressed to the terminal electrodes 30 using a heater tip 500 (FIGS. 3A and 3B). When this happens, the connection end parts 21 are thermally compressed to the terminal electrodes 30 in a condition where their peripheries are covered by insulating sheath layers.

(Operations of Coil Component)

In the coil component 100 pertaining to this embodiment, the diameter of the coil conductive wire 20 is 55 μm or greater but no greater than 180 μm. This way, the coil component 100 achieves a lower resistance because the resistance of the coil part 22 drops. Additionally, the coil component 100 is such that, because the connection end parts 21 are secured to the LT faces of the second plate part 12, there is no need to lead the connection end parts 21 out to the bottom face of the second plate part 12. Furthermore, no thick solder is required to cover the concave and convex parts securing the connection end parts 21. As a result, the coil component 100 becomes small.

It should be noted, however, that such low-resistance, small coil component 100 may present problems depending on the joining mode of the connection end parts 21. Before the operations of the coil component 100 pertaining to this embodiment are explained, the coil component pertaining to a comparative example is explained.

Figure 5A:
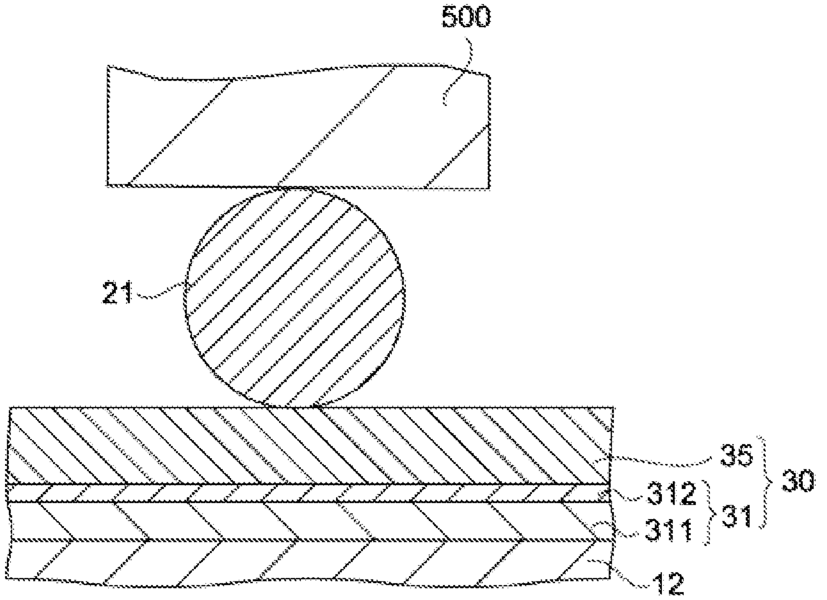
FIGS. 5A and 5B are schematic cross-sectional views of key parts pertaining to a comparative example, explaining how one of the connection end parts is joined to the corresponding one of the terminal electrodes.
Figure 5B:
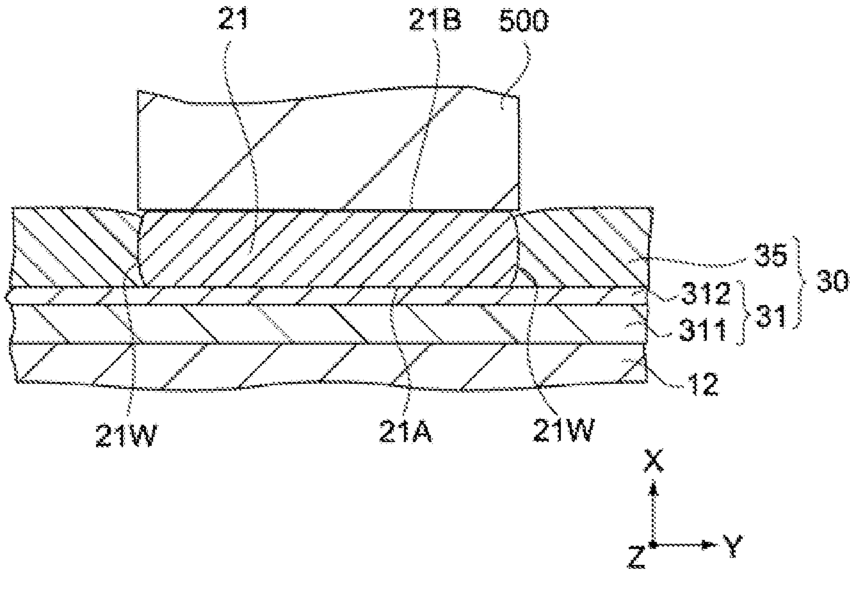

FIGS. 5A and 5B are schematic cross-sectional views of key parts pertaining to the comparative example, explaining how one of the connection end parts is joined to the corresponding one of the terminal electrodes.

Here, FIG. 5A shows the condition before thermal compressing, while FIG. 5B shows the condition after thermal compressing. The metal constituting a conductive layer 35 illustrated in the comparative example is the same as the metal constituting the conductive layer 32 pertaining to this embodiment. Also, the thickness of the conductive layer 35 illustrated in the comparative example is greater than the thickness of the conductive layer 32 pertaining to this embodiment. These are based on an intent to reliably join the connection end parts 21 to the terminal electrodes 30 using a thick solder.

In the comparative example, each of the connection end parts 21 is also crushed by the heater tip 500 in the X-axis direction during thermal compressing, and each of the connection end parts 21 assumes a flat shape after thermal compressing. In the comparative example, however, the thickness of the conductive layer 35 is equivalent to the thickness of each of the connection end parts 21 after thermal compressing. According to this constitution, the phenomena explained below occur easily.

Figure 6A:
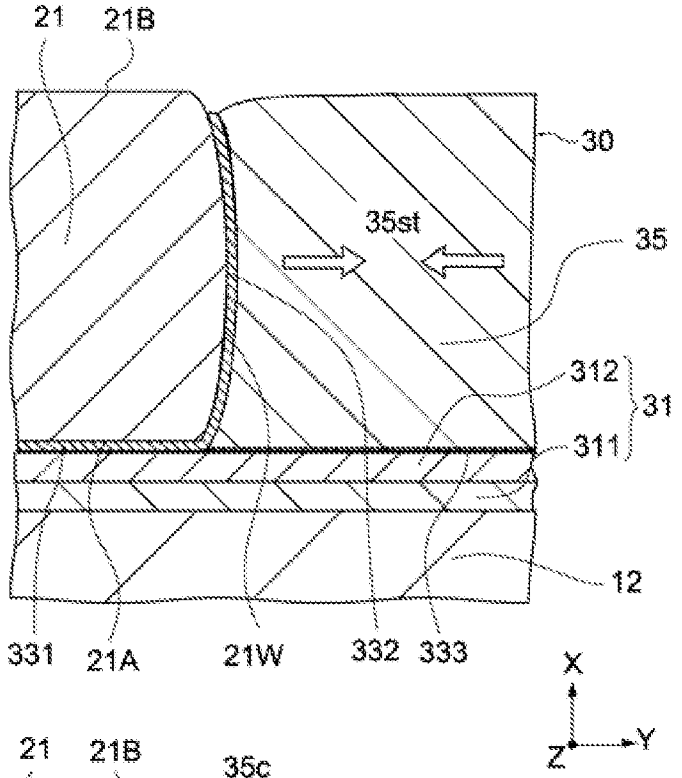
FIGS. 6A and 6B are schematic cross-sectional views explaining internal stress of the conductive layer pertaining to the comparative example.
Figure 6B:
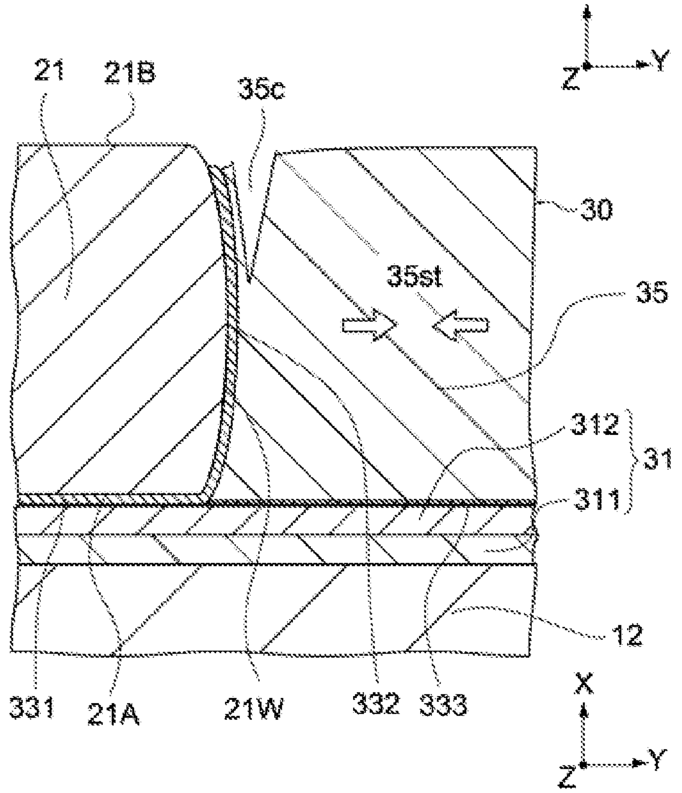

FIGS. 6A and 6B are schematic cross-sectional views explaining the internal stress of the conductive layer pertaining to the comparative example.

The heat applied to the conductive layer 35 from the heater tip 500 during thermal compressing escapes, as a result of natural cooling, from the conductive layer 35 to the outside of the conductive layer 35 after thermal compressing. As it cools naturally, the conductive layer 35 thermally contracts, and an internal stress 35*st* is generated in the conductive layer 35 (FIG. 6A). Thermal contraction also occurs when the joule heat generated by the energization of the coil connective wire 20 cools down.

Here, the second alloy layer 332 is formed between each of the connection end parts 21 and the conductive layer 35, and also the third alloy layer 333 is formed between the conductive layer 35 and the electrode layer 31. This creates a strong adhesive force between each of the connection end parts 21 and the conductive layer 35, and between the conductive layer 35 and the second electrode layer 312. Also, the mechanical strength of the second alloy layer 332 is greater than the mechanical strength of the bulk conductive layer 35.

Accordingly, for the conductive layer 35, for example, the internal stress 35*st* exerts a large load on the surface side of the conductive layer 35. Because of this, cracks 35*c* may be generated on the surface side of the conductive layer 35, for example, between the second alloy layer 332 exhibiting strong mechanical strength and the bulk conductive layer 35 (FIG. 6B). Also, the generated cracks 35*c* may extend further depending on the subsequent heat cycle. As a result, the reliability of the coil component drops in the comparative example.

In contrast to the above, the operations of the coil component 100 pertaining to this embodiment are explained.

Figure 7:
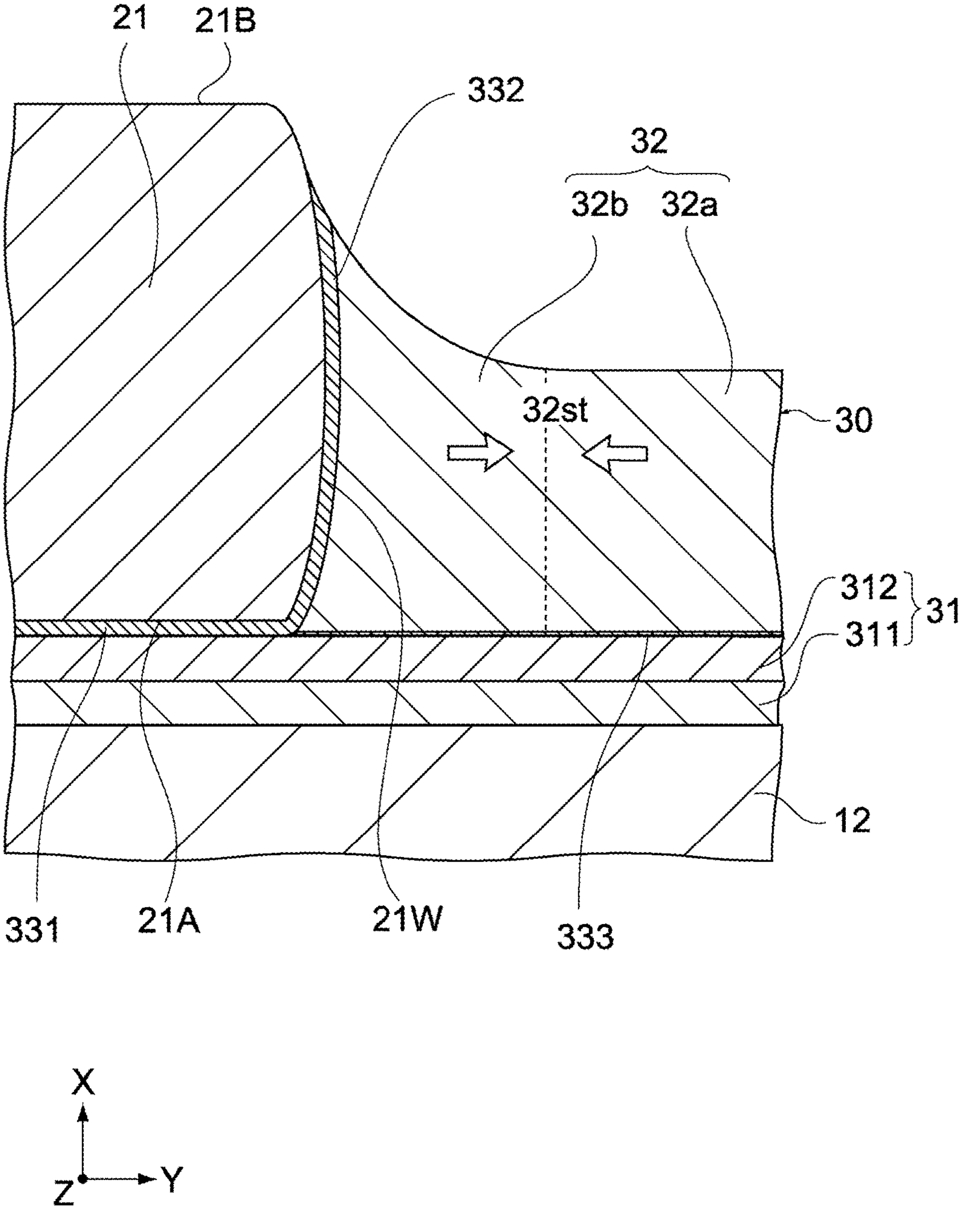
FIG. 7 is a schematic cross-sectional view explaining internal stress of the conductive layer pertaining to this embodiment.

FIG. 7 is a schematic cross-sectional view explaining the internal stress of the conductive layer pertaining to this embodiment.

The conductive layer 32 pertaining to this embodiment has a flat area 32*a* and a skirt area 32*b*, and is constituted so that the height of the flat area 32*a* is less than the height of each of the connection end parts 21. As a result, the volume of the conductive layer 32 pertaining to this embodiment is smaller than the volume of the conductive layer 35 pertaining to the comparative example, and consequently the internal stress 32*st* on the surface side of the conductive layer 32 is mitigated to a greater extent.

Also, the skirt area 32*b* rises from the flat area 32*a* toward the second principle face 21B of each of the connection end parts 21. Because of this, the surface distance of the conductive layer 32 in the Y-axis direction becomes virtually longer than in the comparative example. This makes it easier for the internal stress 32*st* on the surface side of the conductive layer 32 to be mitigated.

Furthermore, the second alloy layer 332 is formed between each of the connection end parts 21 and the conductive layer 32, and also the third alloy layer 333 is formed between the conductive layer 32 and the second electrode layer 312. This creates a strong adhesive force between each of the connection end parts 21 and the conductive layer 32, and between the conductive layer 32 and the second electrode layer 312.

Also, the skirt area 32*b* rises from the flat area 32*a* toward the second principle face 21B of each of the connection end parts 21. This increases the contact area between the conductive layer 32 and each of the connection end parts 21. Furthermore, because the side face 21W of each of the connection end parts 21 is constituted as a convex shape bulging outward, each of the connection end parts 21 engages with the skirt area 32*b* strongly. As a result, each of the connection end parts 21 no longer separates easily from each of the terminal electrodes 30 (the electrode layer 31, the conductive layer 32), not only due to the alloy layer function, but also due to the joining of the side face 21W of each of the connection end parts 21 and the skirt area 32*b*.

As described above, the coil component 100 pertaining to this embodiment is low in resistance, small in size, and also resistant to cracks in the conductive layer 32 (the terminal electrodes 30) or separation of the connection end parts 21. This improves the reliability of the coil component 100 further.

EXAMPLES

Examples are explained below; however, it should be noted the present invention is not limited to the following examples.

Table 1 shows the evaluation results of Examples 1 to 7 and the Comparative Example.

TABLE 1

| | Electrode layer/ conductive layer | Height of flat area (%) | Ratio of skirt area width to height (%) | Flaws Before test | Flaws After test 1 | Flaws After test 2 | Strength (gf) |
|---|---|---|---|---|---|---|---|
| Example 1 | Ag, Ni/Sn | 10 | 200 | Not found | Not found | — | 104 |
| Example 2 | Ag, Ni/Sn | 20 | 200 | Not found | — | Not found | 100 |
| Example 3 | Ag, Ni/Sn | 50 | 200 | Not found | — | Not found | 96 |
| Example 4 | Ag, Ni/Sn | 70 | 200 | Not found | Not found | — | 60 |
| Example 5 | Ag, Ni/Sn | 90 | 200 | Not found | Not found | — | 56 |
| Example 6 | Ag, Ni/Sn | 50 | 90 | Not found | — | Not found | 94 |
| Example 7 | Cu/solder | 50 | 90 | Not found | — | Not found | 96 |
| Comparative Example | Ag, Ni/Sn | 100 | — | Found | Found | — | 94 |

Example 1

The core member 10 having the terminal electrodes 30 as shown in FIGS. 2A to 2C was produced according to the aforementioned method, after which the connection end parts 21 of the coil conductive wire 20 that has been wound around the pillar part 13 were thermally compressed to the terminal electrodes 30 according to the procedure below.

Using a heater tip that had been heated to 700° C., the connection end parts 21 of 75 μm in wire diameter Ø) and having insulating sheath layers were pressed toward the terminal electrodes 30 at a rate of 10 mm/s, and then the heater tip was stopped and held in this condition for 0.3 seconds. Thereafter, the heater tip was pulled away from the connection end parts 21 at a rate of 10 mm/s to release the pressing force that had been applied to the connection end parts 21.

Next, the height of the flat area 32*a* within each of the terminal electrodes 30 to which each of the connection end parts 21 is connected, and the ratio of the height of the flat area 32*a* and the width (W1) of the skirt area 32*b*, were measured. Here, "height" indicates the ratio (%) of the thickness of the flat area 32*a* with respect to the thickness of each of the connection end parts 21. Also, the ratio of the height of the flat area 32*a* and the width (W1) of the skirt area 32*b* (hereinafter, the ratio of height and width) represents the ratio (%) of the height with respect to the width (W1).

A sintered Ag paste layer was used as the first electrode layer 311, while a Ni plating layer was used as the second electrode layer 312. A Sn plating layer was used as the conductive layer 32. Also, 20 such coil components were prepared, and the average height, width, ratio of height to width, and joining strength, were obtained from these 20 coil components.

In addition, the produced coil components were checked for cracks (flaws) in the conductive layer 32 before and after the heat cycle test. For the heat cycle test, either Test 1 in which the temperature was changed over a range of −25° C. to 85° C. for 1,000 cycles, or Test 2 in which the temperature was changed over a range of −40° C. to 125° C. for 1,000 cycles, was selected. Test 2 is a tougher test than Test 1.

Furthermore, the joining strength of the connection end parts 21 with respect to the terminal electrodes 30 was measured. The joining strength was measured using a tension meter by hooking it onto the coil conductive wire 20. The height, width (W1) and flaws were measured using optical microscope images (×100 images).

As a result of evaluation, the height of the flat area was 10% and the ratio of height and width was 200% in Example 1. Also, no cracks were found in the conductive layer before the heat cycle test. Moreover, no cracks were found in the conductive layer even after the heat cycle test (Test 1). The joining strength of the connection end parts 21 was 104 (gf).

Example 2

In Example 2, coil components were formed in the same manner as in Example 1, except that the conductive layer was formed thinner than that in Example 1. In Example 2, the height of the flat area was 20%, and the ratio of height and width was 200%. Also, no cracks were found in the conductive layer before the heat cycle test. Moreover, no cracks were found in the conductive layer even after the heat cycle test (Test 2). The joining strength of the connection end parts 21 was 100 (gf).

Example 3

In Example 3, coil components were formed in the same manner as in Example 1, except that the conductive layer was formed even thinner than that in Example 2. In Example 3, the height of the flat area was 50%, and the ratio of height and width was 200%. Also, no cracks were found in the conductive layer before the heat cycle test. Moreover, no cracks were found in the conductive layer even after the heat cycle test (Test 2). The joining strength of the connection end parts 21 was 96 (gf).

Example 4

In Example 4, coil components were formed in the same manner as in Example 1, except that the conductive layer was formed even thinner than that in Example 3. In Example 4, the height of the flat area was 70%, and the ratio of height and width was 200%. Also, no cracks were found in the conductive layer before the heat cycle test. Moreover, no cracks were found in the conductive layer even after the heat cycle test (Test 1). The joining strength of the connection end parts 21 was 60 (gf).

Example 5

In Example 5, coil components were formed in the same manner as in Example 1, except that the conductive layer was formed even thinner than that in Example 4. In Example 5, the height of the flat area was 90%, and the ratio of height and width was 200%. Also, no cracks were found in the conductive layer before the heat cycle test. Moreover, no cracks were found in the conductive layer even after the heat cycle test (Test 1). The joining strength of the connection end parts 21 was 56 (gf).

Example 6

In Example 6, coil components were formed in the same manner as in Example 1, except that the conductive layer was formed thinner than that in Example 2, and the ratio of height and width was adjusted to 90%. In Example 6, the height of the flat area was 50%. Also, no cracks were found in the conductive layer before the heat cycle test. Moreover, no cracks were found in the conductive layer even after the heat cycle test (Test 2). The joining strength of the connection end parts 21 was 94 (gf).

Example 7

In Example 7, coil components were formed in the same manner as in Example 1, except that the electrode layer was formed as a single Cu plating layer, the conductive layer was formed as a solder plating (such as a tin plating layer, tin alloy plating layer, etc.), the conductive layer was formed thinner than that in Example 2, and the ratio of height and width was adjusted to 90%. In Example 7, the height of the flat area was 50%. Also, no cracks were found in the conductive layer before the heat cycle test. Moreover, no cracks were found in the conductive layer, either, after the heat cycle test (Test 2). The joining strength of the connection end parts 21 was 96 (gf).

In all of Examples 1 to 7, no cracks occurred in the conductive layer before or after the heat cycle test, and the connection end parts 21 had a desired joining strength. This indicates that the thickness of the flat area 32*a* is preferably 10% or more but no more than 90% of the thickness of the connection end parts 21. In addition, preferably the ratio of height and width is 90% or more but no more than 200%.

In particular, Example 2, where the thickness of the flat area 32*a* was adjusted to 20% of the thickness of the connection end parts 21, generated no cracks, even in Test 2 which is more stringent than Test 1, showing that a desired joining strength was obtained. Also, while the joining strength was 56 (gf) in Example 5 where the thickness of the flat area 32*a* was adjusted to 90% of the thickness of the connection end parts 21, the joining strength rose to 60 (gf) in Example 4 where the thickness of the flat area 32*a* was adjusted to 70% of the thickness of the connection end parts 21. This indicates that the thickness of the flat area 32*a* is more preferably 20% or more but no more than 50% of the thickness of the connection end parts 21.

Comparative Example

In the Comparative Example, coil components were formed in the same manner as in Example 1, except that the constitution of the connection end parts and the conductive layer was adjusted as shown in FIGS. 5A and 5B. In other words, the thickness of the conductive layer was the same as the thickness of the connection end parts in the Comparative Example. In the Comparative Example, the joining strength of the connection end parts was 94 (gf), but cracks were found in the conductive layer before the heat cycle test. Moreover, cracks were also found in the conductive layer after the heat cycle test (Test 1).

The foregoing explained an embodiment of the present invention; however, needless to say, the present invention is not limited to the aforementioned embodiment in any way, and various modifications can be added.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A method for manufacturing a coil component, comprising steps of:

(i) preparing a core member having a pillar part;

(ii) forming terminal electrodes each constituted by an electrode layer formed on a surface of the core member, and a conductive layer covering the electrode layer;

(iii) forming a coil part by winding a coil conductive wire covered with an insulating sheath layer around the pillar part; and (iv) physically and electrically connecting ends of the coil part and the terminal electrodes, respectively, by thermocompression bonding wherein the ends of the coil part are heated and compressed, thereby deforming the ends of the coil part into flat-shaped connection end parts and bonding the flat-shaped connection end parts to the terminal electrodes, respectively, wherein, in step (ii), the conductive layer is formed at a thickness which is smaller than a thickness of each flat-shaped connection end part, and in step (iv), the thermocompression bonding comprises: pressing each end of the coil part toward the terminal electrode with a planar heater member whereby the end of the coil part penetrates the conductive layer and is deformed on the electrode layer into the flat-shaped connection end part, thereby bonding the flat-shaped connection end part to the terminal electrode; and then retracting the heater member to move away from the connection end part, wherein:

each connection end part has a first principle face facing a surface of the electrode layer and electrically connected thereto, a second principle face on a side opposite to the first principle face, exposed and projecting from a surface of the conductive layer, and a side face connecting the first principle face and the second principle face;

the conductive layer has a flat area having a first thickness, and a skirt area provided continuously between the flat area and the side face in a direction perpendicular to the thickness direction and having a second thickness greater than the first thickness; and the skirt area slopes onto the side face, the first thickness is smaller than the thickness of the connection end part, and the second thickness decreases from a position at the side face toward the flat area in a direction away from the side face.

2. The method according to claim 1, wherein a cross-section of the coil conductive wire with the insulating sheath layer is circular.

3. The method according to claim 1, wherein, in step (iv), each end of the coil part is covered with the insulating sheath layer prior to the thermocompression bonding and is pressed toward the terminal electrode, wherein the insulating sheath layer of the end of the coil part is decomposed and removed during the thermocompression bonding, thereby bonding the connection end part to the terminal electrode.

4. The method according to claim 1, wherein the first principle face is deformed into a planar surface by being pressed against the electrode layer.

5. The method according to claim 1, wherein the second principle face is deformed into a planar surface by being pressed by the planar heater member.

6. The method according to claim 1, wherein the thermocompression bonding is conducted in a manner that a distance between the first principle face and the second principle face is greater than a distance between a reference plane flush with the first principle face and a most vertically-distanced point of the skirt area from the reference plane.

7. The method according to claim 1, wherein the thermocompression bonding is conducted in a manner that the first thickness is 20% or more but no more than 50% of the thickness of each connection end part.

8. The method according to claim 1, wherein the thermocompression bonding is conducted in a manner that a width of the skirt area which is a distance between the flat area and the side face is smaller than a thickness of each connection end part.

9. The method according to claim 1, wherein the thermocompression bonding is conducted in a manner that each terminal electrode further has a first alloy layer formed between each connection end part and the electrode layer.

10. The method according to claim 1, wherein the thermocompression bonding is conducted in a manner that each terminal electrode further has a second alloy layer formed between each connection end part and the skirt area.

11. The method according to claim 1, wherein the electrode layer includes a layer constituted by Cu.

* * * * *